United States Patent [19]
Schmid et al.

[11] Patent Number: 6,088,872
[45] Date of Patent: Jul. 18, 2000

[54] WIPER BLADE FOR A VEHICLE WINDSCREEN WIPER DEVICE

[75] Inventors: Eckhardt Schmid, Brackenheim; Bruno Egner-Walter, Heilbronn.; Wolfgang Scholl, Gemmrigheim, all of Germany

[73] Assignee: ITT Manufacturing Enterprises, Inc., Wilmington, Del.

[21] Appl. No.: 09/051,174

[22] PCT Filed: Jul. 3, 1996

[86] PCT No.: PCT/EP96/02906

§ 371 Date: Sep. 4, 1998

§ 102(e) Date: Sep. 4, 1998

[87] PCT Pub. No.: WO97/12788

PCT Pub. Date: Apr. 10, 1997

[30] Foreign Application Priority Data

Oct. 2, 1995 [DE] Germany ............... 195 36 742

[51] Int. Cl.[7] ...................... B60S 1/02
[52] U.S. Cl. ............... 15/250.201; 15/250.44
[58] Field of Search ............. 15/250.201, 250.44, 15/250.361, 250.46

[56] References Cited

U.S. PATENT DOCUMENTS

| | | | |
|---|---|---|---|
| 3,874,025 | 4/1975 | Cone .................................. | 15/250.46 |
| 4,309,790 | 1/1982 | Bauer et al. ....................... | 15/250.201 |
| 5,042,106 | 8/1991 | Maubray ............................. | 15/250.201 |
| 5,093,954 | 3/1992 | Kuzuno .............................. | 15/250.201 |
| 5,271,122 | 12/1993 | Roth et al. ......................... | 15/250.46 |
| 5,435,041 | 7/1995 | Ho ....................................... | 15/250.201 |
| 5,454,135 | 10/1995 | Okuya et al. ...................... | 15/250.201 |
| 5,546,627 | 8/1996 | Chen .................................. | 15/250.46 |
| 5,647,088 | 7/1997 | Bommer et al. ................... | 15/250.201 |
| 5,699,583 | 12/1997 | Maubray ............................. | 15/250.201 |
| 5,737,799 | 4/1998 | Maubray et al. ................... | 15/250.44 |
| 5,893,192 | 4/1999 | Lee ..................................... | 15/250.201 |

FOREIGN PATENT DOCUMENTS

| | | |
|---|---|---|
| 0565057 | 10/1993 | European Pat. Off. . |
| 2648413 | 6/1989 | France . |
| 2681026 | 9/1991 | France . |
| 2676409 A1 | 11/1992 | France . |
| 2681029 A1 | 3/1993 | France . |
| 3309972 | 9/1984 | Germany . |
| 3424729 | 2/1986 | Germany . |
| 3532535 | 3/1987 | Germany . |
| 3543850 | 6/1989 | Germany . |
| 4116968 | 11/1992 | Germany . |
| 9310261 | 12/1994 | Germany . |
| 4439109 A1 | 5/1996 | Germany . |
| 1117095 | 6/1968 | United Kingdom . |
| 2064308 | 6/1981 | United Kingdom . |
| 2190834 | 12/1987 | United Kingdom . |
| 2258143 | 2/1993 | United Kingdom . |
| 90/09300 | 8/1990 | WIPO . |

*Primary Examiner*—Terrence R. Till
*Assistant Examiner*—Andrew Aldag
*Attorney, Agent, or Firm*—J. Gordon Lewis

[57] ABSTRACT

In order to improve on a known wiper blade with a wind-directing device, which is manufactured as an integral component of the main support in one piece with this main support, especially with regard to a still greater amplification of the down-force of the wiper blade against the windshield to be wiped, the effective area of the wind-directing device is enlarged as follows: the wind-directing device on its opposite ends has cantilevered, wing-like elongations which protrude beyond the main support in its longitudinal direction.

17 Claims, 1 Drawing Sheet

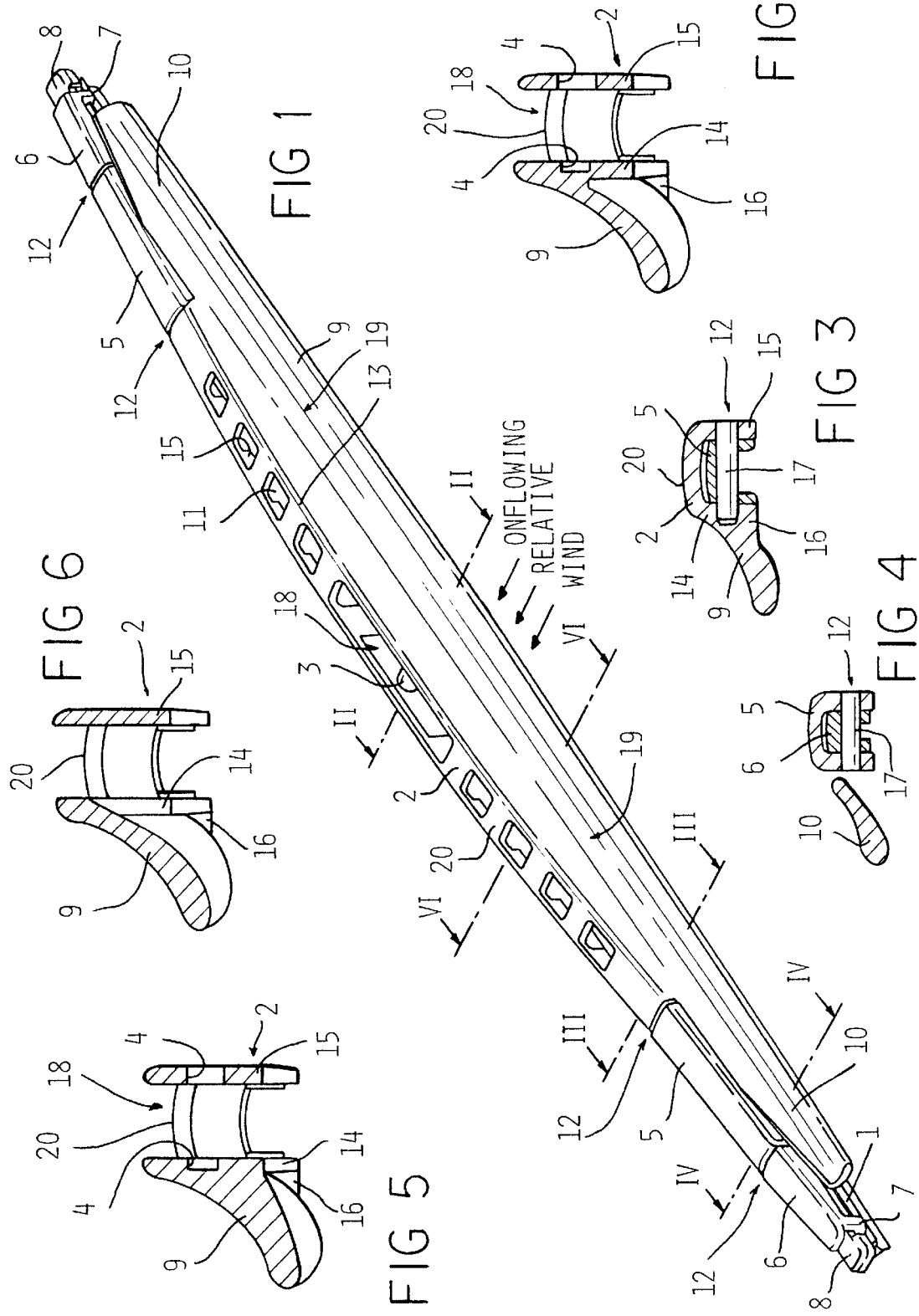

WIPER BLADE FOR A VEHICLE WINDSCREEN WIPER DEVICE

BACKGROUND OF THE INVENTION

The invention relates to a wiper blade for a windshield wiper device for a vehicle, especially a motor vehicle, with a wiper squeegee, which is held and guided on a support system. The support system has a main support which is, at-least in sections, essentially U-shaped in cross-section, and can be hinged to a wiper arm so as to rotate around an axis running transversely to its longitudinal direction. At its opposite ends, a claw support is connected, either directly, or across an intermediate support, in the claws of this claw support, the headpiece of the wiper squeegee is mounted. The main support has a wind-directing device which uses the oncoming relative wind to amplify the down-force of the wiper squeegee against the windshield to be wiped. The wind-directing device is set up on the front side of the main support turned toward the relative wind and is manufactured in one piece with this main support.

A wiper blade of this type, from which the invention proceeds, is known, for example, from German Utility Patent DE 93.10 261.5 U1. A disadvantage of this known wiper blade is that the wind-directing device is shorter than the total length of the main support, so that it ends even before the hinge points for the claw supports or intermediate supports on the opposite end sections of the main support. The effective aerodynamic area of such a wind-directing device is too small to produce the greatest possible effect with regard to amplifying the down-force. In addition, this wind-directing device directly adjoins the lower edge of the front side wall (turned toward the relative wind) of the main support. The wind-directing device, looking at a cross-section of the main support thus forms an angle with the vertical front side wall pointing toward the automotive windshield. The aerodynamics of such a wiper blade with regard to an amplifying effect on the down-force of the wiper squeegee against the windshield to be wiped are thus not optimal.

The object of the invention is to improve a wiper blade of the type initially described, in order to achieve a greater aerodynamic down-force action.

SUMMARY OF THE INVENTION

According to the invention, the object is achieved by means of cantilevered, wing-like elongations of the wind-directing device, which protrude above the support in the longitudinal direction. In this way, the effective area of the wind-directing device is significantly enlarged. According to the embodiment of the wiper blade, the increase can amount to more than 50% in comparison to a known wiper blade. It should be clear that a wind-directing device enlarged in this way also has as a consequence a significantly greater amplification of the down-force of the wiper squeegee against the windshield to be wiped. Because the wind-directing device also now comes out of the front edge, turned toward the relative wind, of the main support spine, another improvement of the aerodynamic behavior of the wiper blade is achieved, and in this way an additional amplification of the down-force can be achieved.

Because the wind-directing device is manufactured in one piece with the main support of the support frame system, the main support, which holds and guides the supports of the support frame system that are inferior and subordinate to the main support, acquires an essentially greater mechanical rigidity than a main support without an integrated wind-directing device. This measure, which is of still greater significance, when the main support or the entire support frame system is manufactured from plastic, thus has an effect of a further improvement of the wiping performance.

By means of an advantageous embodiment of the invention, wherein the wing-like elongations of the wind-directing device extend in the longitudinal direction of the wiper blade beyond a large part of the outer claw supports and thus completely across any intermediate supports that are present on the support frame, a significant enlargement of the effective area of the wind-directing device is achieved, and furthermore, the outer ends of the wiper blade or of the support frame are better shielded from the oncoming relative wind. The latter feature improves the aerodynamic behavior of the wiper blade, because unwanted turbulence of the air flow on non-shielded parts of the wiper blade or of the support frame is avoided.

A further improvement of the aerodynamic behavior of the wiper blade is achieved if the outer claw supports and, if present, the intermediate supports, in the region of their hinge points to the given higher-level support, within whose cross-sectional profile they are mounted, are formed in gradations, so that the outer surfaces of the main support and the claw supports or of the main support and the intermediate supports and—the intermediate supports and the claw supports develop into one another with essentially no break.

Another advantageous embodiment provides that the main support spine is provided with pigeonholes, which extend across its entire width. A part of the oncoming relative wind, which flows through on the underside of the wind-directing device, can thus flow through the main support spine. In this way, by minimizing the development of turbulence, an improvement in the aerodynamic behavior of the wiper blade is achieved.

Another advantageous embodiment of the invention provides that the entire support frame system of the wiper blade, including the wind-directing device and the joint bolts, which connect the claw supports with the main support or the claw supports with the intermediate supports and/or the intermediate supports with the main support, are made of recyclable plastic. Manufacturing the support frame, especially of the main support with the integrated wind-directing device, from plastic, permits numerous design possibilities with regard to forms of the individual parts or of the entire wiper blade that are favorable to the flow process. Along with an advantageous reduction of the weight in comparison to an embodiment in metal, the use of recyclable plastic for manufacturing the support frame is environmentally advantageous. In addition, apart from the removal of the wiper squeegee from the support frame, no additional effort of disassembly is required as preparation for reprocessing of used wiper blades.

If the main support has, on the whole, a U-shaped cross section and the wind-directing device thus proceeds from the edge formed between the main support spine and the front side wall, the front side wall extending below the wind-directing device toward the windshield to be wiped can have a disadvantageous effect on the air flow and impair the desired optimal aerodynamics. Accordingly, in an advantageous further development of the invention, it is provided that the front side wall of the main support is present only in the regions of the suspension case for the wiper arm end and of the hinge points of the claw supports or of the intermediate supports, and elsewhere is absent. In this way the portion of the relative wind flowing along on the underside of the wind-directing device can flow without hindrance and without additional harmful turbulence developing.

In a case where particular value is placed on lateral guidance of the lower-level support (i.e., the claw or intermediate-support) at the main support which is as free of play as possible, a slight deterioration of the aerodynamics can be tolerated so that, additionally, in the regions of the inner ends of the claw supports or of the intermediate supports, the front side wall of the main support can be used for lateral guidance of the claw support or of the intermediate support.

To prevent that the disturbances of the aerodynamics of the wiper blade in the region of section of the front side wall of the main support (present in the region of the suspension case for the wiper arm end) are too great, in addition, an embodiment is recommended wherein, in the region of the suspension case for the wiper arm end, the area between the front side wall of the main support and the rear side (turned away from the relative wind) of the wind-direction device is closed or filled in with material. This measure is also suitable for increasing the stability of the support frame.

An embodiment of the invention wherein the joint bolts mounted at the hinge points in aligned bore holes of the main support and claw support or intermediate support or of the intermediate support or claw support are in each case non-rotatably connected with the support lying on the inside in cross-section and axially secured, and mounted rotatably in the support lying outside has the special advantage that the links of the support frame between the given supports connected with one another are, on the one hand, slightly movable, and, on the other hand, stable enough to be able to withstand the down-force generated through the wind-directing device.

BRIEF DESCRIPTION OF THE DRAWINGS

The invention is discussed in more detail below with reference to an embodiment. In the drawings, FIG. 1 shows a wiper blade in perspective;

FIG. 2 shows an enlarged view of the section II—II from FIG. 1, without the wiper squeegee;

FIG. 3 shows an enlarged view of the section III—III from FIG. 1, without the wiper squeegee;

FIG. 4 shows an enlarged view of the section IV—IV according to FIG. 1, without the wiper squeegee;

FIG. 5 shows another embodiment of the wiper blade, section II—II from FIG. 1, without the wiper squeegee; and FIG. 6 shows an enlarged view of the section VI—VI from FIG. 1, without the wiper squeegee.

DETAILED DESCRIPTION OF THE DRAWINGS

For the wiper blade shown in FIG. 1, a wiper squeegee 1, which brushes over the windshield to be wiped when the windshield wiper is in operation, is held and guided on a support system. The support system, which is manufactured entirely from a recyclable plastic, has a main support 2, which, in its middle region, has a suspension case 18, in which the free end of a wiper arm is to be connected (with the main support 2) rotatably around an axis running transversely to the longitudinal direction of the main support 2. For identification of this rotational axis, in FIG. 1 a joint bolt 3 is drawn in, which either be a component of the main support 2 or serve as a separate part for connecting the wiper arm and wiper blade. In FIG. 2 this joint bolt 3 is not present; only the bearing holes 4 in which this joint bolt is to be mounted can be seen. FIG. 1 shows that at the opposite ends of the main support 2, an intermediate support 5 is hinged in each case, and on each of the outer ends of the intermediate supports 5, an outer claw support 6 is linked. The supports form a hierarchy with the main support 2 being superior to the intermediate supports 5 which are superior to the claw supports 6. The wiper squeegee 1 is held by the claws 7 of the support frame, and only the outer claws are visible in the figure. The longitudinal displaceability of wiper squeegee 1 in claws 7 of the support frame is limited by the end pieces 8, which are fastened in each case to an end of the wiper squeegee 1 and are in active connection with the outer claw supports 6. An essential feature of the wiper blade, the wind-directing device 9, can be seen in FIG. 1; this wind-directing device is mounted on the longitudinal side (turned toward the relative wind) of the support frame, and is manufactured in one piece with the main support 2. This wind-directing device 9 is characterized at its ends by a cantilevered, wing-like elongation 10 in its longitudinal direction, which protrudes beyond the main support 2 proper. In this way both wing-like elongations 10 extend across the intermediate supports 5 and the greater part of the outer claw supports 6, so that only a relatively small part of the support frame and of the wiper squeegee protrudes beyond the wind-directing device 9 in the longitudinal direction.

FIG. 1 shows that the main support spine 20 has numerous pigeonholes 11, which extend across the entire width of the main support spine 20. These pigeonholes 11 can, at a part of the on-flowing relative wind, allow through-flow in a known fashion. In addition, this shows that in the region of the hinge points 12 of the intermediate support 5 to the main support 2 and of the outer claw supports 6 to the intermediate supports 5, the outer surface of the intermediate supports 5 adjoins almost without a break the outer surface of the main support 2 and the outer surface of the outer claw support 6 adjoins almost without a break the outer surface of the intermediate support 5. The outer form of the end pieces 8 is also adapted to the form of the outer claw supports 6. This results in flow relationships that are more favorable on the whole and, on the other hand, improves the stylistic appearance of this wiper blade.

It can also be seen that the wind-directing device 9 proceeds from the edge 13 of the main support spine 20 that is turned toward the relative wind. FIGS. 2, 3, and 5 show that the wind-directing device 9 is supported at various points by ribs 16, which extend between the front side wall 14 and the wind-directing device 9. In the section of FIG. 3, this rib 16 is located advantageously at a hinge point 12, so that the joint bolt 17 mounted in the side walls 14 and 15 can have a more secure hold.

FIG. 2 through 5 show that the main support 2, the intermediate support 5, and the claw support 6 have U-shaped cross sections and that the main support 2 in its profile section engages with the intermediate support 5 and the intermediate support 5 engages with the claw support 6. At the hinge points 12, the individual supports are in each case connected to one another with a joint bolt 17, which is mounted transversely to the longitudinal direction of the wiper blade. The joint bolts 17 are also made of recyclable plastic, and mounted non-rotatably on the given lower-level support (i.e., on the inside) and securely held in the axial direction, and mounted rotatably on the higher-level support (i.e., on the outside).

FIG. 5 shows, in particular, that in the region of the suspension case 18, the area between the wind-directing device 9 and the front side wall 14 of the main support 2 is completely filled in with material.

Finally, it should be pointed out that in an advantageous embodiment of the invention, in which the front side wall 14 of the main support 2 is present only in sections, in the regions 19 (FIG. 1) of the main support 2, sections of the front side wall 14 can be present. In these regions 19, the remaining sections of the front side wall 14, as well as the rear side wall 15, serve for lateral guidance of the lower-level intermediate or claw support on the main support 2. The sections of the front side wall 14 present in the regions 19 are, in each case, located in the region of the inner end of the relevant lower-level support.

What is claimed is:

1. A wiper blade for a windshield wiper device of a vehicle, with a wind-directing device for amplifying the down-force of a wiper squeegee against a windshield by means of oncoming relative wind, and with a support frame system comprising:

an elongate main support having a spine, a rear wall extending an entire length of the spine, and spaced front wall sections located only at selected portions of the spine to define U-shaped transverse cross sections only in regions of a suspension case for a wiper arm and for hinge points of claw supports, said rear wall and said front wall sections being parallel at said U-shaped transverse cross sections, the main support being connectable rotatably around an axis transverse to a longitudinal direction of the wiper blade with a wiper arm and including opposite ends;

claw supports connected to the main support through hinge points; and a wind-directing device turned toward the relative wind and mounted on a longitudinal side of the wiper blade and formed on the main support including a spine, said wind-directing device overlying said front wall sections, wherein the wind-directing device emerges from a front edge of the main support spine and extends toward the windshield and against the relative wind, and wherein the wind-directing device, in the longitudinal direction, has opposite ends with cantilevered, elongate wings, which protrude beyond the opposite ends of the main support in the longitudinal direction.

2. The wiper blade according to claim 1, wherein the elongate wings extend in the longitudinal direction of the wiper blade across most of the claw supports of the support frame.

3. The wiper blade according to claim 1, wherein the claw supports further comprise:

primary and secondary claw supports arranged in a hierarchy of support with respect to the main support and, in the hinge points, secondary supports are engaged by a cross-sectional profile of a primary support, wherein secondary supports, in the region of their hinge points, are formed in stepped reductions in external cross-sectional profiles, so that the primary support and the secondary supports have similar external cross-sectional profiles in close proximity to and substantially adjoining one another.

4. The wiper blade according to claim 1, wherein the main support spine is provided with pigeonholes, that extend across its entire width and permit the relative wind streaming along under the wind-directing device to pass through.

5. The wiper blade according to claim 1, further comprising joint bolts for connecting the supports to one another, wherein the entire support frame system, including the wind-directing device end joint bolts are made of plastic.

6. The wiper blade according to claim 1, wherein the claw supports further comprise:

primary and secondary claw supports arranged in a hierarchy with respect to the main support and additionally, in the regions of inner ends of secondary supports, a front side wall of the main support is present for lateral guidance of the secondary support.

7. The wiper blade according to claim 1, wherein the region of a suspension case for the wiper arm end, a front side wall of the main support is integrally formed to define the wind-direction device.

8. The wiper blade according to claim 1, wherein the claw supports further comprise:

primary and secondary claw supports arranged in a hierarchy with respect to the main support and, in the hinge points, secondary supports are engaged by a cross-sectional profile of a primary support, and joint bolts are mounted at the hinge points in aligned boreholes of the primary support and secondary support and are in each case non-rotatably connected with the secondary support and axially secured, and mounted rotatably in the primary support.

9. The wiper blade according to claim 1, wherein the wind-directing device is formed integrally as one piece on the main support for amplifying the down-force of the wiper blade in response to an oncoming relative wind.

10. A wiper blade for a windshield wiper for a windshield of a vehicle comprising:

an elongate main support having a spine, a rear wall extending an entire length of the spine, and spaced front wall sections located only at selected portions of the spine to define U-shaped transverse cross-sections only in regions of a suspension case for a wiper arm and for hinge points of claw supports, said rear wall and front wall sections being parallel at said U-shaped transverse cross-sections, the main support being connectable rotatably around an axis to a wiper arm, the main support including opposite ends;

claw supports connected to the main support through hinge points to each end of the main support, the claw supports, in the region of the hinge points, formed with a stepped reduction in external cross-sectional profile defining at least one shoulder, so that the claw supports have substantially similar external cross-sectional profiles in proximity to the region of the hinge points defining a substantially smooth aerodynamic profile for a transitional region from the end of the main support to the claw supports; and a wind-directing device formed integrally as one piece on the main support for amplifying the down-force of the wiper blade in response to an oncoming relative wind, the wind-directing device turned toward the relative wind and mounted on a longitudinal side of the wiper blade, the wind-directing device emerging from a front edge of the main support spine overlying said front wall sections and extending toward the windshield and against the relative wind, and the wind-directing device, in the longitudinal direction, having opposite ends with cantilevered, elongate wings, protruding beyond the opposite ends of the main support in the longitudinal direction.

11. The wiper blade according to claim 10, wherein the elongate wings extend in the longitudinal direction of the wiper blade across most of the claw supports of the support frame.

12. The wiper blade according to claim 10, wherein the claw supports further comprise:

primary and secondary claw supports arranged in a hierarchy with respect to the main support and, in the hinge points, secondary supports are engaged by a cross-sectional profile of a primary support, wherein secondary supports, in the region of their hinge points, are formed in stepped reductions of external cross-sectional profiles, so that the main support and the secondary supports have similar external cross-sectional profiles in close proximity to and substantially adjoining one another.

13. The wiper blade according to claim 10, wherein the main support spine is provided with pigeonholes, that extend across its entire width and permit the relative wind streaming along under the wind-directing device to pass through.

14. The wiper blade according to claim 10, further comprising joint bolts for connecting the supports to one another, wherein the entire support frame system, including the wind-directing device and joint bolts are made of plastic.

15. The wiper blade according to claim 10 wherein the claw supports further comprise:

primary and secondary claw supports arranged in a hierarchy with respect to the main support and additionally, in the regions of inner ends of secondary supports, a front side wall of the main support is present for lateral guidance of the secondary support.

16. The wiper blade according to claim 10, wherein the region of a suspension case for the wiper arm end, the area between a front side wall of the main support and a rear side of the wind-direction device is closed.

17. The wiper blade according to claim 10, wherein the claw supports further comprise:

primary and secondary claw supports arranged in a hierarchy with respect to the main support and, in the hinge points, secondary supports are engaged by a cross-sectional profile of a primary support, and joint bolts are mounted at the hinge points in aligned boreholes of the primary support and secondary support and are in each case non-rotatably connected with the secondary support and axially secured, and mounted rotatably in the primary support.

* * * * *